United States Patent [19]

Malvino et al.

[11] Patent Number: 4,854,878

[45] Date of Patent: Aug. 8, 1989

[54] TEXTBOOK WITH ANIMATED ILLUSTRATIONS

[75] Inventors: Albert P. Malvino, Los Altos; Joanna M. Malvino, Cupertino, both of Calif.

[73] Assignee: Malvino, Inc., Mountain View, Calif.

[21] Appl. No.: 178,774

[22] Filed: Mar. 31, 1988

Related U.S. Application Data

[63] Continuation of Ser. No. 803,016, Nov. 29, 1985, abandoned.

[51] Int. Cl.⁴ .............................................. G09B 7/00
[52] U.S. Cl. .................................. 434/335; 434/307; 434/317; 434/323
[58] Field of Search ............... 434/307, 317, 318, 323, 434/335

[56] References Cited

U.S. PATENT DOCUMENTS

| | | | |
|---|---|---|---|
| 4,124,943 | 11/1978 | Mitchell et al. | 434/307 |
| 4,308,017 | 12/1981 | Laughon et al. | 434/335 |
| 4,360,345 | 11/1982 | Hon | 434/307 |
| 4,411,628 | 10/1983 | Laughon et al. | 434/335 |

OTHER PUBLICATIONS

William Hawkins, "Video Teachers", Popular Science Feb. 1984, pp. 110 and 114.

*Primary Examiner*—Leo P. Ricard
*Attorney, Agent, or Firm*—Donald C. Feix

[57] ABSTRACT

Method and apparatus are disclosed for teaching with the use of an electronic processor and associated display, preferably in conjunction with a conventional textbook, the method comprising the steps of selecting verbal data providing a description of a selected concept and animation data providing a visual, non-verbal illustration of the same concept, storing both the verbal and animation data in the processor and operating the processor for displaying the verbal and animation data to a student separately and in a selected and predetermined sequence for impressing both the verbal and animation data upon the student. Corresponding apparatus according to the invention comprises an electronic device with a processor component, a display component and necessary control components for carrying out the steps of the invention as set forth above. The teaching method and apparatus are both preferably adapted for subsequently displaying the verbal and animation data in a drill mode requiring participation of the student in order to facilitate a more complete understanding of the concept by the student. The invention also preferably contemplates a teaching method and apparatus recognizing propensities of different portions of the brain, such as the left and right sides, to particularly handle either verbal or animated, non-verbal types of information, the teaching method and apparatus of the invention preferably being adapted for impressing suitable information upon the respective portions of the brain for further facilitating more complete understanding of the concept or concepts by the student.

2 Claims, 2 Drawing Sheets

TEXTBOOK WITH ANIMATED ILLUSTRATIONS

This is a continuation of co-pending application Ser. No. 803,016 filed on Nov. 28, 1985 now abandoned.

FIELD OF THE INVENTION

The present invention relates to a teaching method and apparatus and more particularly such a method and apparatus of teaching involving the use of electronic processor and display means.

BACKGROUND OF THE INVENTION

Various methods and devices have been developed over the years for the purpose of teaching or conveying to students concepts ranging from relatively simple to relatively complex subjects. The following invention is described particularly with reference to the teaching of technical subjects such as electronics. However, it will be apparent that similar teaching methods and apparatus may be employed for a wide variety of subjects.

In general, it has been found that, even with students who are eager to learn, a continual presentation of verbal data is often ineffective to convey various concepts to students. This is particularly true of relatively complex subjects with which a student is not familiar.

Professional teachers commonly employ a variety of devices at intervals during presentation of such verbal information to better maintain the students' interest and to facilitate learning. For example, humor is often employed in this manner to spark the interest of the students and make them more receptive to additional verbal information.

Similarly, illustrations are commonly employed in textbooks and films, for example, to accomplish generally the same purpose and also to provide additional information concerning concepts being taught to the students.

Electronic devices have also been employed for teaching purposes to further facilitate an understanding by students of various concepts. For example, U.S. Pat. No. 4,505,682 issued Mar. 19, 1985 to Thompson and entitled "Learning Aid With Match and Compare Mode of Operations" described an electronic learning aid capable of synthetic speech. At the same time, the device included means for displaying illustrations to the students, for example, to further facilitate the teaching of various concepts.

Similarly, U.S. Pat. No. 4,144,656 issued Mar. 20, 1979 to Podkopsev et al and entitled "Teaching Machine for Studying Foreign and Native Languages" disclosed the use of an electronic programming device for presenting verbal data relating to foreign and native languages for example.

These patents are believed generally representative of the prior art available to date for teaching a wide variety of subjects. In particular, the prior art devices employ electronic processing units generally for presenting data similar to that available in the past in conventional forms such as textbooks.

However, even with the various improvements in teaching methods and apparatus available to data, there has been found to remain a need for further improvements in order to assure a more complete understanding by the student.

SUMMARY OF THE INVENTION

It is therefore an object of the invention to provide an improved teaching method and apparatus which overcomes limitations of the type generally referred to above while further facilitating an understanding by students of both relatively simple and complex concepts concerning widely varying subject matter.

In this regard, the present invention is based in part upon the principle of employing sequential presentation to the student of both verbal data and animation data selected for disclosing a particular concept or concepts to the student. As used in connection with the present invention, the term "verbal data" is intended to include information descriptive of concepts in various subjects, the descriptive data normally being in the form of words, either written or oral. The term "animation data" in intended to include non-verbal data preferably in the form of animated representations developed for conveying either concrete or abstract principles or concepts to the student.

In further explanation concerning the broad aspect of the invention referred to above, numerous references relate to the ability or propensity of different portions of the brain to be particularly receptive to different forms of data or information. In particular, these references refer to the greater or dominant ability of the left side of the brain to better deal with verbal information, particularly words which are either written or spoken. By contrast, the right side of the brain is commonly referred to as being more receptive or better able to process non-verbal information including pictorial imagery or animation data of the type referred to above.

Whether or not the preceding theory is accurate, the present invention is also based upon the concept that where a subject to be taught can be disclosed both by verbal data and by animation data as defined above, it can better be impressed upon the student by sequential presentation of both types of data to the student. In this regard, it is also believed that the brain is generally capable of receiving only one type of information at a time, for example either verbal or animation data. Accordingly, it is a further object of the invention to provide a teaching method and apparatus wherein the verbal and animation data are presented sequentially to the student in a predetermined pattern selected for facilitating an understanding of a selected concept or concepts by the student.

Studies of the type referred to above have further established that nerve connections between the brain and sensory organs of the body, particularly the eyes and ears, are formed with a cross-over pattern so that the left side or portion of the brain tends to govern and be responsive to the right side of the body while the right side of the brain tends to govern and be responsive to the left side of the brain. Generally, statements such as those set forth immediately above are not intended to be absolute but only to indicate a dominant tendency for the respective sides of the brain. In other words, even though the right side of the brain may be receptive to verbal data, the left side of the brain is believed dominant in that regard. Similarly, although the left side of the brain may be partially receptive to non-verbal data or imagery, the right side of the brain is believed strongly dominant in that regard.

More particularly, it is an object of the invention to provide a teaching method employing electronic processor and display means wherein both verbal and animation data relating to a selected concept are stored in an electronic processor, the electronic processor being operated together with display means in a teaching mode for displaying verbal and animation data to a student or students in a selected or predetermined sequence for impressing both the verbal and animation data upon the student and thereafter displaying the verbal and animation data in a sequence requiring participation of the student in order to facilitate a more complete understanding of the concept by the student.

It is a further related object of the invention to provide a teaching method and apparatus for carrying out steps such as those summarized above wherein the electronic processor and display means is employed together with a textbook directed toward the same concepts or subjects, the textbook itself being of generally conventional format. Preferably, the textbook includes verbal data as defined above and possible conventional illustrations relating to the concepts or subjects dealt with by the textbook.

It is a further related object of the invention to provide a teaching method and apparatus based upon sequential presentation of verbal and animation data so that the verbal and animation data are respectively impressed principally upon portions of the student's brain particularly receptive to that type of information.

In this regard, the invention recognizes theoretical discussions to the effect that the left side of the brain is more receptive to verbal data and the right side of the brain is more receptive to non-verbal data or imagery. To that extent, the invention is based upon the concept that more complete understanding of a concept may be achieved in students if respective types of information are impressed upon separate and receptive portions of the brain.

It is a further preferred object of the invention to require participation by the student in the presentation of verbal and animation data in order to stimulate mental interchange between the left and right portions or sides of the brain in order to facilitate a complete understanding of the concept or concepts by the student.

Similarly, it is a further related object of the invention to provide teaching apparatus including processor means for storing both verbal and animation data, display means being selected to include side by side panels for presenting verbal data on a panel arranged on the right side as viewed by the student with animation data being presented on a panel arranged on the left side as viewed by the student. In accordance with the theories discussed above, such an arrangement is believed to be particularly effective in facilitating transmission of verbal data to the left side of the student's brain and for facilitating transmission of animation data to the right side of the student's brain.

Other and further objects of the invention will be apparent from the following description and claims and are illustrated in the accompanying drawings which, by way of illustration, show preferred embodiments of the invention and the principles thereof and what are now considered to be the best modes contemplated for the applying these principles. Other embodiments of the invention embodying the same or equivalent principles may be used and structural changes may be made a desired by those skilled in the art without departing from the present invention and the purview of the appended claims.

DESCRIPTION OF THE PREFERRED EMBODIMENTS

Figure 1:
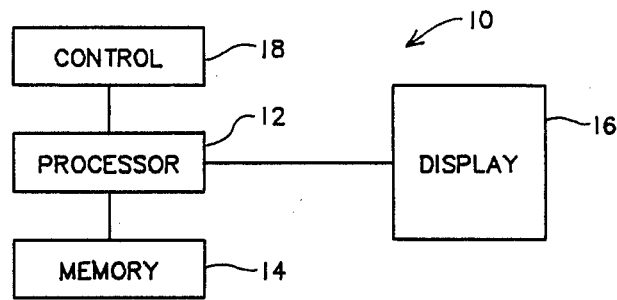
FIG. 1 is a schematic representation of basic teaching apparatus constructed in accordance with the present invention.

Referring now to the drawings and particularly to FIG. 1, teaching apparatus constructed in accordance with the present invention is generally indicated at 10 including a data processing unit 12 and a memory storage unit 14 which in themselves are of generally conventional construction. However, in accordance with the present invention, the processing unit 12 and memory unit 14 are adapted for the storing of both verbal data and animation data, as defined above. For example, the processor means 12 and memory means 14 may include conventional disk drive means (not shown) adapting the apparatus 10 for use with a variety of programs, for example in the form of floppy disks (also not shown) in order to employ the same apparatus 10 with a large number of concepts and a variety of teaching subjects. For example, the method and apparatus of the invention are decribed further below with particular reference to the teaching of one or more concepts in the general subject of electronics. However, that subject is selected only as an example and it is believed obvious that many other subjects can be taught with the method and apparatus of the present invention.

The teaching apparatus 10 further includes a display unit 16 preferably in the form of a video screen. However, it is again to be noted that a visual display unit or screen is only one type of display unit according to the present invention. For example, the teaching apparatus 10 could also include audio devices (not otherwise shown) for presenting verbal data in oral form or even for presenting non-verbal data or imagery such as music for example in connection with an appropriate subject.

In order to preferably adapt the teaching apparatus 10 for requiring a participation or interaction by the student in the presentation of verbal and/or animation data, control means are indicated at 18. The control means 18 may take any of a variety of forms in connection with the invention. For example, as will be described in greater detail below in connection with FIG. 4, the control means may comprise an element in the form of a RETURN key or a multiple strike key. As will also be described below in connection with FIG. 4, a RETURN key could be used, for example, with the processor unit 12 being adapted for pausing after the presentation of a selected amount of information to the student. The student could then take as much time as necessary to grasp the information presented and then operate the RETURN key in order to command the processor to continue with the presentation of data. In that regard, the RETURN key would probably be most useful with the processor unit 12 operating in a teaching mode where verbal and animation data is presented to the student in a predetermined sequence for familiarizing him with the related concept.

Thereafter, the processor unit 12 and memory unit 14 could be operated in a drill mode, for example, to provide a review of the concept to the student and further requiring participation of the student through the use of the multiple strike key. For example, the processing unit 12 and memory unit 14 could be adapted for reviewing selected portions of information and then presenting a multiple choice question to the student. The student could then indicate the selected answer by means of the multiple strike key with the processing unit 12 and memory unit 14 being programmed to present additional data to the student depending upon whether the student selected the correct answer or an incorrect answer. For example, if the student selected a correct answer, the processing unit 12 and memory unit 14 could be programmed to continue with the presentation of additional data. However, if the student selected the wrong answer, the processing unit 12 and memory unit 14 could be adapted for reviewing that portion of data and again presenting the same question to the student in order to assure a proper understanding and grasp of the information by the student.

The function and operation of the various components in the teaching apparatus 10 will be more apparent in connection with the animation data presented in FIGS. 2A-C and 3A-C together with corresponding verbal data as set forth below.

Figure 2A:
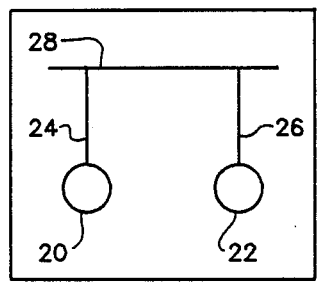
FIGS. 2A-C represent spaced apart frames of animation data selected for displaying a particular concept.
Figure 2B:
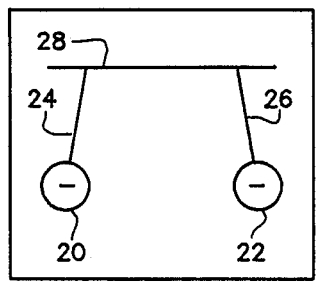
Figure 2C:
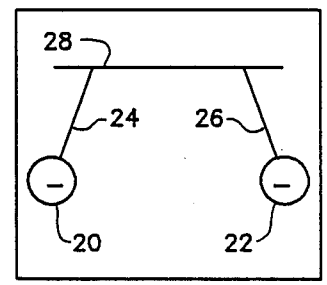

Referring also to FIGS. 2A-C and 3A-C, the teaching apparatus 10 as noted above may be employed for teaching one or more concepts in the general area of electronics. For example, FIGS. 2A-C represent selected frames from a large number of frames in an animation series relating to the concept of similarly charge bodies. Furthermore, FIG. 2A represents two uncharged bodies 20 and 22 respectively suspended by imaginary flexible lines 24 and 26 from a fixed element 28.

To initiate the animation sequence represented in FIGS. 2A-C, the bodies 20 and 22 are assumed to be impressed with similar electrical charges, for example, both bodies 20 and 22 being impressed with a minus charge as indicated in FIGS. 2B and 2C. In the animation frames sequentially represented by FIGS. 2B and 2C, the similarly charged bodies 20 and 22 are repelled by each other and commence moving apart as indicated in FIG. 2B. Repulsion between the two bodies 20 and 22 continues through the animation sequence until a frame represented by FIG. 2C is reached where the bodies 20 and 22 have moved completely apart from each other.

Figure 3A:
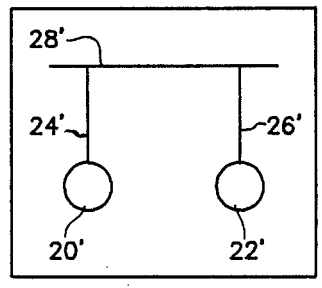
FIGS. 3A-C similarly represent spaced apart frames in animation data for a closely related concept, verbal data corresponding to the animation data of both FIGS. 2A-C and 3A-C being set forth below within the specification.
Figure 3B:
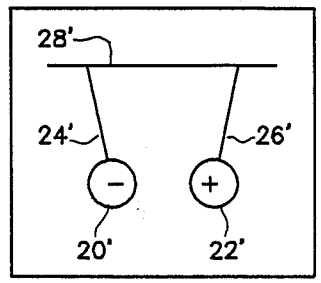
Figure 3C:
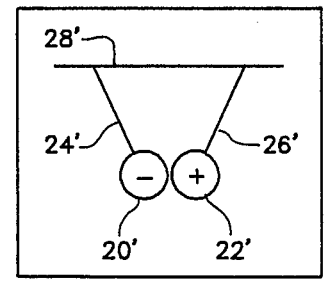

A similar concept in electronics is disclosed in FIGS. 3A-C relating to the application of opposite charges to similar bodies 20' and 22'. Here again, in FIG. 3A, the bodies 20' and 22' are shown in an uncharged condition where they are unaffected by each other. In the animation sequence represented by FIGS. 3A-C, the bodies 20' and 22' are then impressed with opposite charges, for example, the body 20' being impressed with a negative charge and the body 22' being impressed with a positive charge. Thereafter, the bodies 20' and 22' are attracted toward each other and commence moving toward each other as shown by the animation frame represented in FIG. 3B. The animation continues until the oppositely charged bodies 20' and 22' are moved closely adjacent each other as shown in the animation frame represented by FIG. 3C.

While the animation data is illustrated respectively in FIGS. 2A-C and FIGS. 3A-C, corresponding verbal data is provided, for example, by a description of those figures as set forth immediately above.

Accordingly, the processing unit 12 and the memory unit 14 of the teaching apparatus 10 of FIG. 1 are is programmed to store animation data and verbal data as defined immediately above.

Thereafter, the processing 12 and memory unit 14 could be programmed to operate in conjunction with the display unit 16 for presenting the verbal data and animation data in a predetermined sequence selected for facilitating and understanding of the concept by the student. For example, the sequence of data presentation to the student could be established to sequentially stimulate different portions of the brain in accordance with the theoretical discussion set forth above. In other words, verbal data could be initially displayed on the screen 16 to be impressed principally upon the left side of the student's brain. Thereafter, animation data could be displayed to be impressed principally upon the right side of the student's brain. Even without taking into consideration the different functions of the left and right sides of the brain in accordance with the theoretical discussion set forth above, the sequential presentation of verbal data and animation data would also have the effect of presenting the concept to the student with greater variety, thus serving to more easily maintain the student's interest.

Thus, the sequential display of verbal and animation data in accordance with the present invention is believed to facilitate the transmission of the subject concept to the student either by the "left brain-right brain" theory as set forth above and also by providing greater variety to interest and stimulate the student.

Preferably, the teaching mode described above is followed by a drill mode wherein the verbal data and animation data are again presented to the student in a predetermined sequence while requiring participation by the student to continue the presentation. For example, in the drill mode of operation, the student is shown selected frames such as those represented in FIGS. 2B, 2C, 3B and 3C followed by a question requiring a response from the student before the presentation is continued. The question posed by the apparatus 10 could then set forth a number of possibilities soliciting a multiple choice response by the student. Alternatively, the apparatus 10 could set forth an incomplete sentence requiring the student to complete the sentence. Still further, the apparatus 10 could require a complete verbal description by the student relating to the question posed by the frame of animation data.

In all of the situations referred to above, the apparatus 10 poses a question in one form of data, namely animation data represented by FIGS. 2A–C and 3A–C with an answer by the student being solicited in the opposite type of data, namely verbal data. The drill mode for the invention could of course also be carried out with a question being posed verbally and requiring an answer by the student in a form corresponding to the animation data. For example, the student could be requested to sketch a representation corresponding to the verbal description in the question. At the same time, it is also obvious that the apparatus 10 could pose a question and solicit a response from the student in the same type of data. For example, the apparatus 10 could pose a verbal question with a verbal response being solicited from the student.

In any event, it will be apparent that a wide variety of drill techniques could be carried out in accordance with the method of the present invention as set forth above.

Figure 4:
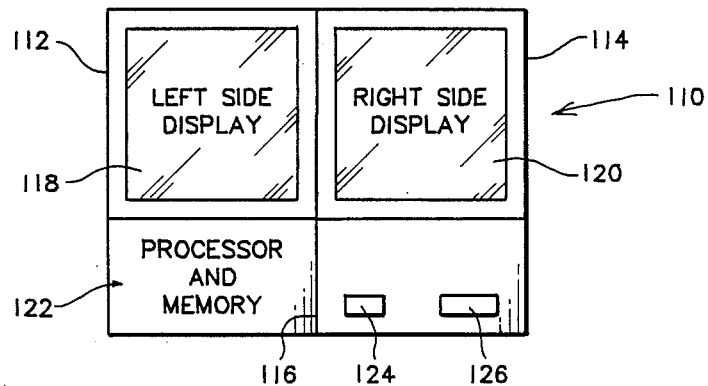
FIG. 4 is a partially schematic representation of a preferred embodiment of teaching apparatus constructed in accordance with the present invention and recognizing theory of the type summarized above and described in greater detail below.

Noting again the theoretical discussion concerning the propensities of the left and right sides of the brain for being predominantly receptive to verbal and non-verbal data respectively, a preferred embodiment of teaching apparatus according to the present invention is generally indicated at 110 in FIG. 4. In addition to particularly being adapted for use in connection with "left brain-right brain" theory, the teaching apparatus 110 of FIG. 4 is also intended to include generally the same components described above in connection with FIG. 1 while being generally in the form of a conventional text book. In other words, the teaching apparatus 110 of FIG. 4 recognizes that the teaching apparatus of the present invention is particularly contemplated for replacing or supplementing conventional textbooks and accordingly could be used in much the same manner as a textbook.

The teaching apparatus 110 of FIG. 4 is preferably formed with left and right side panels 112 and 114 interconnected by means of a hinge joint 116. Thus, the panels 112 and 114 could be closed together like a book or opened to expose a first display unit or screen 118 arranged on the left panel 112 and a second display unit or screen 120 arranged on the right side panel 114. With the panels 112 and 114 being opened as viewed in FIG. 4, the first and second display screens 118 and 120 are arranged in side by side relation with the first display screen 118 being on the left and the second display screen 120 being on the right as viewed by the student.

As with the teaching apparatus 10 of FIG. 1, processing and memory means 122 are formed, for example, in a portion of the left panel 112. Here again, the processing and memory means 122 are of a type for accepting disks or the like (not shown) to permit us of the teaching apparatus 110 with a wide variety o subjects.

At the same time, controls associated with the processing and memory means 122 as well as with the first and second and display screens 118 and 120 are provided, for example, on a portion of the right panel 114. These controls include a RETURN key 124 operable by the student for commanding the processing and memory means 122 to continue with the presentation of additional data after the student had sufficient time to absorb previously presented data. In addition, multiple strike control means 126 are also formed on the right panel 114 for permitting the student to participate in drill mode presentation of data as summarized above.

Figure 5:
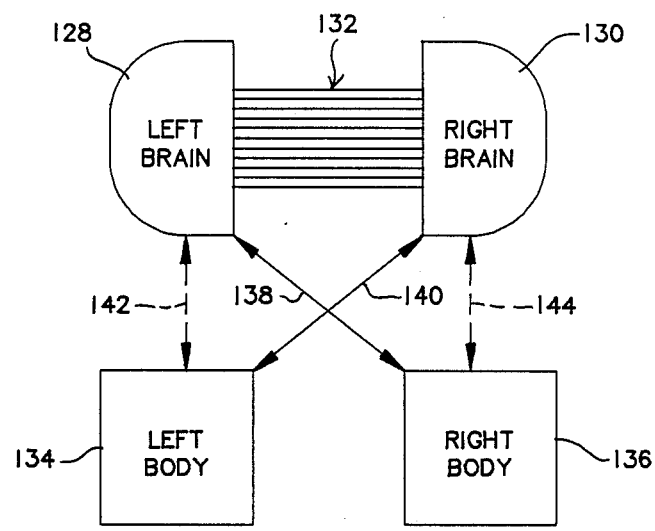
FIG. 5 is a schematic representation of the manner in which the right and left sides of the braih interact with left and right sides of the body, particularly the eyes and ears, to demonstrate the manner in which the brain is responsive to verbal and animation data as provided by the present invention and particularly responsive to such data presented in the preferred teaching apparatus disclosed in FIG. 4.

In order to further facilitate an understanding of the preferred teaching apparatus illustrated in FIG. 4, the "left brain-right brain" theoretical discussion is represented in FIG. 5 with the left portion of the brain being indicated at 128 and the right portion of the brain being indicatd at 130. The left and right portions of the brain 128 and 130 are interconnected by nerve fibers, commonly termed the corpus callosum and generally indicatd at 132. At the same time, left and right portions of the body, particularly including sensory organs such as the eyes and ear (not otherwise shown) are respectively indicated at 134 and 136.

In accordance with the theory referred to above, the left and right brain portions 128 and 130 are dominantly interconnected with the right body and the left body portions 136 and 134 respectively as indicated by the solid line arrows 138 and 140. The dotted arrows 142 and 144 indicate a relatively limited degree of responsiveness for the left and right sides of the brain to the corresponding sides of the body.

Viewing FIGS. 4 and 5 in combination, the sensory organs on the left side of the body are particularly responsive to the left side display 118 with the sensory organs in the right body portion 136 being particularly responsive to the right side display 120 of the teaching apparatus 110. With the second or right side screen 120 being adapted for displaying verbal data, that verbal data is sensed by the right side of the body and dominantly transmitted to the left portion 128 of the brain which is particularly responsive to that type of data. Similarly, with animation or non-verbal data being displayed on the left side screen 118, that data is perceived by the left body portion 134 and dominantly transmitted to the right brain portion 130 which is particularly responsive to that type of data. Thus, the teaching apparatus 110 and the method of apparatus provided by the use of such data is believed to be particularly effective for impressing both verbal and animation data in the student's brain. At the same time, with drill modes being carried out in the same manner described above but with the verbal data and animation data being displayed on the respective screens, the same advantages would be realized through the "left brain-right brain" theory set forth above.

Figure 6:
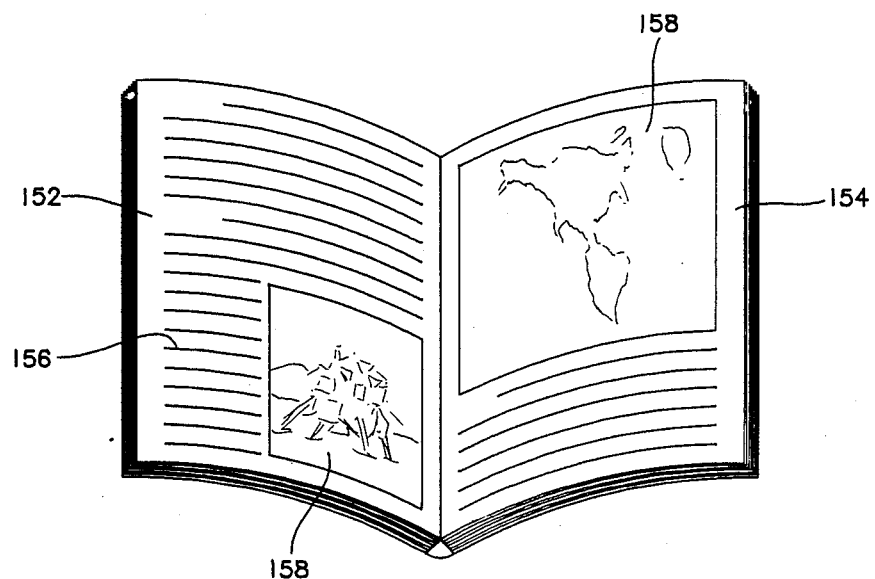
FIG. 6 is a representation of two representative facing pages from a textbook with which the method and apparatus of the invention are employed.

The method and apparatus as described above are preferably employed in conjunction with a textbook directed toward the same subject. For example, referring to FIG. 6, representative pages of the textbook are indicated at 152 and 154 and include verbal data in the form of written text 156 also directed toward similar concepts in the subject of electronics, for example. The textbook also preparably contains conventional illustrations or "still representations" 158 to further promote understanding of the subject by the student.

In a preferred teaching method, the textbook is used in conventional fashion to develop some initial familiarity of the student with the basic concepts of the subject. The method and apparatus of the present invention are then employed as described above to assure complete understanding by the student of the subject. However, it will be apparent to those skilled in the teaching sciences, in particular, that various combinations of textbook study and use of the method and apparatus of the present invention may be employed to particular advantage, for example, in different teaching applications and environments.

Accordingly, while the preferred embodiments of the present invention have been illustrated and described above, it is to be understood that these embodiments are capable of further variation and modification and the invention is not to be limited to the precise details set forth but rather is to be availed of such changes and alterations as fall within the purview of the following claims:

We claim:

1. A teaching method for teaching complex and/or abstract concepts by means of both a conventional textbook and complementary animated moving illustrations which provide an animated textbook, said teaching method employing a conventional textbook and a complementary electronic display and comprising, (a) opening the conventional textbook to a page or pages which describe a selected complex and/or abstract concept so that the student can read and study the text book description of the selected concept, (b) storing animation data for the selected concept on the electronic display, (c) operating, by input from the student, the electronic display for displaying the animation data to the student in the form of animated moving illustrations which are complementary to the selected concept described in the conventional textbook and to thereby display the animation data in the form of an animated textbook.

said electronic display being constructed so that the electronic display can be operated in both an initial teaching mode for displaying the animation data in an initial, predetermined sequence and in subsequent drill mode which requires continued participation of the student in order to continue the display and in order to obtain displays of animated illustrations responsive to specific inputs from the student, whereby the selected complex and/or abstract concept can be taught by the study of both the conventional textbook and the complementary animated moving illustrations which provide the animated textbook.

2. Teaching apparatus for teaching complex and/or abstract concepts by both a conventional textbook and complementary animated moving illustrations, which provide an animated textbook, said teaching apparatus comprising, a conventional textbook which can be opened to a page or pages describing a selected complex and/or abstract concept so that the student can rear and study the conventional textbook description of the selected concept, electronic display means for storing and for displaying complementary animation data for the selected concept, said electronic display means having operating means for operating, by input from the student, the electronic display means for displaying the animation data to the student in the form of animated moving illustrations which are complementary to the selected concept described in the conventional textbook and to thereby display the animation data in the form of an animated textbook, said electronic display means being constructed so that the electronic display means can be operated in both an initial teaching mode for displaying the animation data in an initial, predetermined sequence and in a subsequent drill code which requires continued participation of the student in order to continue the display and in order to obtain displays of animated illustrations responsive to specific inputs from the student, whereby the selected complex and/or abstract concept can be taught by the study of both the conventional textbook and the complementary animated moving illustrations which provide the animated textbook.

* * * * *

UNITED STATES PATENT AND TRADEMARK OFFICE
CERTIFICATE OF CORRECTION

PATENT NO. : 4,854,878

DATED : August 8, 1989

INVENTOR(S) : Albert P. Malvino

It is certified that error appears in the above-identified patent and that said Letters Patent is hereby corrected as shown below:

Column 3, line 65, "a" should read --as--.

Column 7, line 52, "o" should read --of--.

Column 10, line 12, "rear" should read --read--.

Signed and Sealed this

Twenty-ninth Day of May, 1990

Attest:

HARRY F. MANBECK, JR.

*Attesting Officer*   Commissioner of Patents and Trademarks